UNITED STATES PATENT OFFICE.

WILLIAM BEACH PRATT, OF WELLESLEY, MASSACHUSETTS, ASSIGNOR TO E. H. CLAPP RUBBER COMPANY, OF BOSTON, MASSACHUSETTS, A CORPORATION OF MASSACHUSETTS.

SULFUR-TERPENE COMPOUND.

1,349,909.     Specification of Letters Patent.     Patented Aug. 17, 1920.

No Drawing.     Application filed October 3, 1919. Serial No. 328,235.

*To all whom it may concern:*

Be it known that I, WILLIAM BEACH PRATT, a citizen of the United States, residing at Wellesley, in the county of Norfolk and State of Massachusetts, have invented new and useful Improvements in Sulfur-Terpene Compounds, of which the following is a specification.

I have discovered that it is possible to treat terpenes, and certain of their derivatives, with sulfur to produce sulfur-terpene compounds which are useful in the practical arts. When the treatment is completed, the product is a hard mass which may be dissolved in a suitable solvent, either alone or with other substances, and used for coating surfaces or impregnating and coating the fibers of absorbent materials, and, when the reaction is moderated or carried on short of completion, the product is more or less viscous or semi-solid, and is available for use alone or in solution or in admixture with other materials in the arts.

One process, by which the sulfur-terpene compound can be produced, is as follows:— equal parts by weight of oil of turpentine and sulfur are placed in a suitable converter, in the neck of which is fixed a condenser of any suitable character in such manner that products of condensation will pass back into the converter, a port being provided for carrying off the gases generated during the reaction without loss of the volatile constituents. The contents of the converter are heated to melt the sulfur, and, by the time a temperature of 150° C. is reached, the reaction is well determined. During the ensuing period of one hour, the temperature is raised to 175° C., the mass being agitated, preferably with air, and, during the next two hours, the temperature is raised 12.5° C. each hour, with lessened or no agitation. During the reaction which appears to be progressive, the sulfur reacts with the turpentine partly to combine therewith and partly to liberate hydrogen from the turpentine in the form of hydrogen sulfid. The velocity of the reaction increases with the temperature and thereby leads not only to a difficulty controllable evolution of hydrogen sulfid, but also to secondary reaction or reactions which result in the removal of the sulfur introduced into the terpene residue with the hydrogen thereof in the form of hydrogen sulfid, and the production of char, and it is because of these facts that the elevation in temperature is moderated.

At the expiration of the described period of treatment, the product, when cooled to ordinary temperatures, is a hard brittle mass resembling the mineral rubbers. It breaks with a conchoidal fracture, presenting a vitreous luster on the surfaces of fracture. A portion of the mass, when manipulated between the fingers, will, under the heat of the hand, become so softened that it can be molded. This product is insoluble in water, partly soluble in acetone, soluble in turpentine with reaction, and soluble in toluol and xylol. When in solution, it will pass through parchment, and, according to this test, is noncolloidal, thereby differing from vulcanized rubber or other similar compounds which are of a colloidal nature. On analysis I have found certain of said hard sulfur-terpene products, produced from equal parts of sulfur and turpentine by the specific operation herein described, to contain on analysis from 30% to 50% of sulfur, indicating that certain amounts of sulfur pass off with the volatile constituents of the mass undergoing treatment.

As a further check on determining the completion of the treatment, when the component ingredients,—sulfur and turpentine,—are in equal parts to produce the hereinbefore described hard mass, the output of hydrogen sulfid may be measured, and, when 44% of the original sulfur has been liberated as hydrogen sulfid, the heating is stopped or the mass is withdrawn from the flask, and the product permitted to cool. The period of reaction will, however, vary with the desired properties of the product, but, in any event, the progress of the reaction may be checked with the aid of the liberated hydrogen sulfid.

When the reaction has reached that stage when free sulfur is no longer present in the mass, the latter on cooling is a black viscous liquid. During the reaction which follows that stage, if the heating is continued, the evolution of hydrogen sulfid continues, with increasing viscosity of the mass until charring occurs. The reaction therefore may be interrupted at will, and sulfur-terpene products of various characteristics and properties produced as desired. Whether the reaction is one of substitution or replacement, such for example as follows:

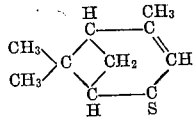

or of addition:

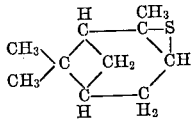

or of the formation of conjugated compounds:

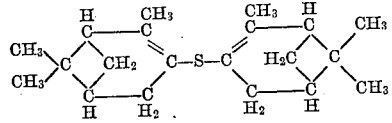

or that two, or all three, of such reactions occur simultaneously, or nearly so, I am unable at this time definitely to state, except in so far as may be suggested by the evolution of the $H_2S$ noted, but I have given above, samples of each as derived from pinene, which is an important terpene occurring in oil of turpentine, using for the pinene a structural formula containing a picean ring as presented by Baeyer in the *Berichte der Deutsche Chemische Gesellschaft*, volume 29, page 2779.

The proportions of the turpentine and sulfur may be varied, but I prefer generally to use sulfur in excess, of theoretical atomic proportions. I have found it possible to produce products having the same ultimate sulfur content and physical characteristics as those hereinbefore described, by the utilization of a smaller quantity of sulfur, providing the operation is carried on at lower temperatures for a longer period.

The herein-described solid and semi-solid sulfur-terpene compounds may be used for various purposes. The semi-solid products as produced may be employed for coating or impregnating various materials; but, to employ the solid product for like purposes, I prefer to dissolve it in a suitable solvent. A further characteristic of the sulfur-terpene product of the reaction is that, when molten or when dissolved in a solvent such as toluol or xylol, it has the property of impregnating the fibers of cotton and other equivalent fibers, of more or less dissolving rubber, and of vulcanizing onto or with rubber.

In case the semi-solid sulfur-compound product of the reaction is used for the purposes herein stated, especially for protective or insulating coatings, its subjection to heat causes a continued reaction, with the liberation of $H_2S$—and ultimately produces the desired end products. For example, when such a semi-solid product is mixed with a quantity of wood pulp and the mixture is confined in a heated press, ultimately a hard solid mass results in which the terpene compound is so changed into a solid compound as to act as a binder for the wood pulp. For most practical purposes, in order to provide a quick drying coating or impregnating material, I prefer to dissolve the hard compound in toluol or xylol or their equivalent. When so dissolved, the volatile constituents of the solution evaporate in the cold, or more rapidly under moderate heat. For many purposes, other substances may be added to the solution, such as pigments which give greater body to the mass, or, if the solvent is capable of dissolving crude or vulcanized rubber, I may dissolve either of these in the solvent coincidently with, or before or after, dissolving the sulfo-terpene compound, in order to secure a colloidal mass having greater elastic or less adhesive properties.

So far as I have yet discovered, any terpene (i. e. those hydrocarbons having the empirical constitution of $C_5H_8$ with their four known sub-classes, even depolymerized rubber and certain of their derivatives such as terpenole, rosin and the like) may be subjected to the process herein set forth to produce end products having substantially the characteristics herein described.

The hydrogen sulfid, liberated during the reaction, may, if desired, be burned to recover sulfur dioxid or may be disposed of in any other desired manner.

What I claim is:

1. A sulfur compound, which exhibits the following characteristics, to wit, neutral, amorphous, noncolloidal, insoluble in water, soluble in toluol and xylol, and capable of reacting with rubber.

2. A sulfur-terpene compound capable of passing through parchment.

3. A sulfur-terpene compound, consisting of a noncolloidal black mass, ranging from a viscous liquid to a hard black solid which breaks with a conchoidal fracture, said mass being insoluble in water, and soluble in toluol and xylol.

4. A noncolloidal sulfur-terpene compound having the characteristics and properties of that product which is produced by heating a terpene and sulfur at atmospheric pressure and at a temperature above that at which sulfur melts, until hydrogen sulfid is liberated.

5. The herein described process which consists in causing sulfur to react with a terpene under conditions in which hydrogen sulfid is liberated.

6. The herein described process which consists in causing sulfur to react with oil of turpentine under conditions in which hydrogen sulfid is liberated.

7. The herein described process which consists in causing sulfur to react with a terpene at atmospheric pressure and at a temperature of 150° C. or above.

8. The herein described process which consists in causing sulfur to react with a terpene at atmospheric pressure and at a temperature above that at which sulfur melts, and under conditions in which hydrogen sulfid is liberated, and continuing the reaction for a sufficient time until a mass is produced which is hard on cooling.

9. The herein described process which consists in causing sulfur to react with a terpene at atmospheric pressure and at a temperature of and above 150° C., and continuing the reaction until the product, on cooling, is a sulfur-terpene product which, when molten or dissolved in a solvent, is capable of impregnating cotton fibers.

10. A product consisting of a solution containing a noncolloidal sulfur-terpene compound.

11. A product consisting of a non-colloidal sulfur-terpene compound dissolved in xylol.

In testimony whereof I have affixed my signature.

WILLIAM BEACH PRATT.